United States Patent
Zheng et al.

(10) Patent No.: US 12,223,706 B2
(45) Date of Patent: Feb. 11, 2025

(54) TRAINING ENERGY-BASED MODELS FROM A SINGLE IMAGE FOR INTERNAL LEARNING AND INFERENCE USING TRAINED MODELS

(71) Applicant: Baidu USA, LLC, Sunnyvale, CA (US)

(72) Inventors: Zilong Zheng, Beijing (CN); Jianwen Xie, Santa Clara, CA (US); Ping Li, Bellevue, WA (US)

(73) Assignee: Baidu USA LLC, Sunnyvale, CA (US)

( * ) Notice: Subject to any disclaimer, the term of this patent is extended or adjusted under 35 U.S.C. 154(b) by 394 days.

(21) Appl. No.: 17/824,694

(22) Filed: May 25, 2022

(65) Prior Publication Data
US 2022/0398836 A1    Dec. 15, 2022

Related U.S. Application Data

(60) Provisional application No. 63/208,842, filed on Jun. 9, 2021.

(51) Int. Cl.
  *G06V 10/82*    (2022.01)
  *G06V 10/774*   (2022.01)
  *G06V 10/84*    (2022.01)

(52) U.S. Cl.
  CPC ............ *G06V 10/85* (2022.01); *G06V 10/774* (2022.01); *G06V 10/82* (2022.01)

(58) Field of Classification Search
  CPC ...... G06V 10/85; G06V 10/774; G06V 10/82; G06V 10/778; G06V 10/52
  See application file for complete search history.

(56) References Cited

PUBLICATIONS

Shaham et al., SinGAN: Learning a Generative Model from a Single Natural Image, 2019, Proc. of the IEEE Conf. on Computer Vision & Pattern Recognition. (Year: 2019).*

Xie et al., Cooperative Learning of Energy-Based Model and Latent Variable Model via MCMC Teaching, 2018, The Thirty-Second AAAI Conference on Artificial Intelligence (AAAI-18). (Year: 2018).*

(Continued)

*Primary Examiner* — Said M Elnoubi
(74) *Attorney, Agent, or Firm* — Oppedahl Patent Law Firm LLC

(57) ABSTRACT

Different from prior works that model the internal distribution of patches within an image implicitly with a top-down latent variable model (e.g., generator), embodiments explicitly represent the statistical distribution within a single image by using an energy-based generative framework, where a pyramid of energy functions, each parameterized by a bottom-up deep neural network, are used to capture the distributions of patches at different resolutions. Also, embodiments of a coarse-to-fine sequential training and sampling strategy are presented to train the model efficiently. Besides learning to generate random samples from white noise, embodiments can learn in parallel with a self-supervised task (e.g., recover an input image from its corrupted version), which can further improve the descriptive power of the learned model. Embodiments does not require an auxiliary model (e.g., discriminator) to assist the training, and embodiments also unify internal statistics learning and image generation in a single framework.

18 Claims, 9 Drawing Sheets

(56) References Cited

PUBLICATIONS

Xie et al.,"Generative VoxelNet:learning energy-based models for 3D shape synthesis and analysis," arXiv preprint arXiv:2012.13522, 2020. (16pgs).

Xie et al.,"Learning energybased model with variational auto-encoder as amortized sampler," arXiv preprint arXiv:2012.14936, 2021. (11pgs).

Xie et al.,"Synthesizing dynamic patterns by spatial-temporal generative convnet," arXiv preprint arXiv:1606.00972, 2017. (9pgs).

Xie et al.,"Learning energy-based spatial-temporal generative convnets for dynamic patterns," arXiv preprint arXiv:1909.11975, 2019. (15pgs).

Yu et al.,"LSUN: Construction of a large-scale image dataset using deep learning with humans in the loop," arXiv preprint arXiv:1506.03365, 2016. (9 pgs).

Zhou et al.,"Learning deep features for scene recognition using places database," In Advances in Neural Information Processing Systems (NIPS), 2014. (9 pgs).

Zhu et al.,"Exploring texture ensembles by efficient Markov chain Monte Carlo-toward a 'trichromacy' theory of texture," IEEE Transactions on Pattern Analysis & Machine Intelligence (TPAMI), 2000. (17pgs).

Zhu et al.,"Filters, Random Fields and Maximum Entropy (FRAME) Towards a unified theory for texture modeling," International Journal of Computer Vision (IJCV), 27(2):107-126, 1998. (44pgs).

Goodfellow et al.,"Generative adversarial nets," arXiv preprint arXiv: 1406.2661, 2014. (9pgs).

Grathwohl et al.,"Your classifier is secretly an energy based model and you should treat it like one," arXiv preprint arXiv: 1912.03263, 2020. (23pgs).

Han et al.,"Divergence triangle for joint training of generator model, energy-based model, and inferential model," arXiv preprint arXiv:1812.10907, 2019. (13pgs).

Heusel et al.,"Gans trained by a two time-scale update rule converge to a local nash equilibrium," arXiv preprint arXiv:1706.08500, 2018. (38pgs).

Isola et al.,"Image-to-image translation with conditional adversarial networks," arXiv preprint arXiv:1611.07004, 2018. (17pgs).

Bela Julesz, "Visual pattern discrimination," IRE transactions on Information Theory, 8(2):84-92, 1962. [Abstract] (1pg).

Kingma et al.,"Adam: A method for stochastic optimization," arXiv preprint arXiv:1412.6980, 2017. (15pgs).

Kingma et al.,"Auto-encoding variational bayes," arXiv preprint arXiv:1312.6114, 2014. (14pgs).

LeCun et al.,"A tutorial on energy-based learning," Predicting structured data, 1(0), 2006.(60pgs).

Li et al.,"Precomputed real-time texture synthesis with markovian generative adversarial networks," arXiv preprint arXiv:1604.04382, 2016. (17pgs).

Jun S Liu, "Monte Carlo Strategies in Scientific Computing," Springer Science & Business Media, 2008. (7pgs).

Marr et al.,"A computational theory of human stereo vision," Proceedings of the Royal Society of London, Series B. Biological Sciences, 204(1156):301-328, 1979. (30pgs).

Martin et al.,"A database of human segmented natural images and its application to evaluating segmentation algorithms and measuring ecological statistics," In Proceedings of the IEEE International Conference on Computer Vision (ICCV), vol. 2, IEEE, 2001. (11pgs).

Mittal et al.,"Making a "Making a Completely Blind" Image Quality Analyzer," IEEE Signal processing letters, 20(3):209-212, 2012. (4pgs).

Miyato et al.,"Spectral normalization for generative adversarial networks," International Conference on Learning Representations (ICLR), 2018 (26pgs).

R.M. Neal, "Mcmc using hamiltonian dynamics," Handbook of Markov Chain Monte Carlo, 2(11):2, 2011. (50pgs).

Nijkamp et al.,"Learning non-convergent non-persistent short-runMCMC toward energy-based model," In Advances in Neural Information Processing Systems (NeurIPS), 2019.(11pgs).

Rott Shaham et al.,"SinGAN: Learning a Generative Model from a Single Natural Image," In Proc. of the IEEE Conf. on Computer Vision & Pattern Recognition (CVPR), 2019. (11pgs).

Shocher et al.,"InGAN: Capturing and Retargeting the "DNA" of a Natural Image," In Proc. of the IEEE International Conf. on Computer Vision (ICCV), 2019. (10 pgs).

Barbu et al.,"Monte Carlo Methods," Springer, 2020. (14pgs).

Blau et al.,"The Perception-Distortion Tradeoff" arXiv preprint arXiv: 1711.06077, 2020. (18pgs).

Clevert et al.,"Fast and accurate deep network learning by exponential linear units (ELUs)," arXiv preprint arXiv:1511.07289, 2016. (14pgs).

Du et al.,"Energy-based models for atomic-resolution protein conformations," arXiv preprint arXiv:2004.13167, 2020. (16pgs).

Du et al.,"Implicit generation and modeling with energy based models," In Advances in Neural Information Processing Systems (NeurIPS), 2019. (11pgs).

Gao et al.,"Learning generative convnets via multi-grid modeling and sampling," Proceedings of the IEEE Conference on Computer Vision & Pattern Recognition (CVPR), 2018. (10p).

Gao et al.,"Flow contrastive estimation of energy-based models," arXiv preprint arXiv:1912.00589, 2020. (13pgs).

Gao et al.,"Learning energy-based models by diffusion recovery likelihood," arXiv preprint arXiv:2012.08125, 2021. (25pgs).

Gatys et al.,"A neural algorithm of artistic style," arXiv preprint arXiv:1508.06576, 2015. (16pgs).

Geman et al.,"Stochastic relaxation, gibbs distributions, & the bayesian restoration of images," IEEE Transactions on Pattern Analysis & Machine Intelligence (TPAMI), 1984.(21p).

Shocher et al.,""Zero-shot" super-resolution using deep internal learning," In Proc. of the IEEE Conference on Computer Vision & Pattern Recognition (CVPR), 2018. (9 pgs).

Szegedy et al.,"Going deeper with convolutions," In Proceedings of the IEEE Conference on Computer Vision and Pattern Recognition (CVPR), 2015. (9 pgs).

Tsai et al.,"Deep Image Harmonization," In Proceedings of the IEEE Conference on Computer Vision and Pattern Recognition (CVPR), 2017. (9 pgs).

Ulyanov et al.,"Deep Image Prior," In Proceedings of the IEEE Conference on Computer Vision and Pattern Recognition (CVPR), 2018. (9 pgs).

Wu et al.,"Sparse and deep generalizations of the FRAME model," Annals of Mathematical Sciences and Applications, 3(1):211-254, 2018. (44pgs).

Xie et al.,"Cooperative learning of energy-based model and latent variable model via memc teaching," In Proc. of the AAAI Conf. on Artificial Intelligence (AAAI), 2018. (10pgs).

Xie et al.,"A theory of generative convnet," In International Conference on Machine Learning (ICML), 2016. (10pgs).

Xie et al.,"Generative PointNet: Deep Energy-Based Learning on Unordered Point Sets for 3D Generation, Reconstruction and Classification," In Proc. of the IEEE Conf. on Computer Vision & Pattern Recognition (CVPR), 2021. (10pgs).

Xie et al.,"Learning Descriptor Networks for 3D Shape Synthesis and Analysis," arXiv preprint arXiv:1804.00586, 2018. (10pgs).

* cited by examiner

200

```
┌─────────────────────────────────────────────────────────┐
│ Given a single training image and an initial set of     │
│ energy-based neural network models (EBMs) in which each │  ─ 205
│ EBM is configured to synthesize an image at a scale &   │
│ the scales of the set of EBMs range from a minimal      │
│ scale to a maximum scale                                │
└─────────────────────────────────────────────────────────┘

┌─────────────────────────────────────────────────────────┐
│ Create multi-scale versions of the training image       │  ─ 210
│ (e.g., by downsampling operation)                       │
└─────────────────────────────────────────────────────────┘
                            │
                            ▼
┌─────────────────────────────────────────────────────────┐
│ Starting with the EBM with the minimal scale and        │
│ successively moving through the EBMs to the EBM with    │  ─ 215
│ the maximum scale, repeating the following steps until  │
│ a stop condition is reached:                            │
└─────────────────────────────────────────────────────────┘
                            │
                            ▼
┌─────────────────────────────────────────┐
│ Sample an image at the current scale    │
│ using the EBM at the current scale and  │  ─ 215-A
│ a sampling methodology                  │
└─────────────────────────────────────────┘
                            │
                            ▼
┌─────────────────────────────────────────┐
│ Update the parameters of the current    │
│ EBM using a comparison comprising the   │  ─ 215-B
│ sampled image and training image at     │
│ the current scale                       │
└─────────────────────────────────────────┘
                            │
                            ▼
┌─────────────────────────────────────────┐
│ Output synthesized images at each scale │  ─ 220
└─────────────────────────────────────────┘
```

| Given a maximum scale, s', of the energy-based neural network model (EBM) that is to be sampled, a set of energy-based neural network models (EBMs) in which the scales of the set of EBMs range from a minimal scale to the maximum scale, and a number of Langevin steps for each of the scales starting with the EBM with the minimal scale and successively moving through the EBMs to the EBM with the maximum scale, perform the following steps: | ⎯ 605 |

↓

| Initialize the Langevin dynamics process with an image (if it is the minimum scale, the initial image may be obtained from sampling from a uniform distribution, and if it is not the minimum scale, the initial image is an upsampled version of the Langevin output at the immediate prior scale) | ⎯ 610 |

↓

| Perform the set number of Langevin steps for the current scale to obtain a final synthesized image for that scale | ⎯ 615 |

↓

| Output a synthesized image at the maximum scale | ⎯ 620 |

Given: (1) a set of multi-scale energy-based neural network models (EBMs) in which each EBM is configured to synthesize an image at a scale and the scales of the set of EBMs range from a minimal scale to a maximum scale; (2) a multi-scale set of versions of a training image that ranges from the minimal scale to the maximum scale so that each EBM has a corresponding version of the training image at the same scale as the EBM; and (3) an input condition image: ⟵ 705

↓

Train the multi-scale set of EBMs for a random image generation/unconditional task and a conditional task using the conditional image as an input to at lowest scale EBM, in which training loss represents a combination of the unconditional generation loss and conditional generation loss ⟵ 710

FIG. 7

TRAINING ENERGY-BASED MODELS FROM A SINGLE IMAGE FOR INTERNAL LEARNING AND INFERENCE USING TRAINED MODELS

CROSS-REFERENCE TO RELATED APPLICATION

This patent application is related to and claims priority benefit under 35 USC § 119(e) to and commonly-owned U.S. Pat. App. No. 63/208,842, filed on 9 Jun. 2021, entitled "TRAINING ENERGY-BASED MODELS FROM A SINGLE IMAGE FOR INTERNAL LEARNING AND INFERENCE USING TRAINED MODELS," and listing Zilong Zheng, Jianwen Xie, and Ping Li as inventors, which patent document is incorporated by reference herein in its entirety and for all purposes.

BACKGROUND

A. Technical Field

The present disclosure relates generally to systems and methods for computer learning that can provide improved computer performance, features, and uses. More particularly, the present disclosure relates to systems and methods image processing.

B. Background

Learning internal statistics or modeling the internal distribution of patches within a single natural image may be considered to date back to learning statistical models for texture synthesis in computer vision. In 1926, a pioneer Béla Julesz initiated the research on texture perception in pre-attentive vision by raising the following fundamental question: "What features and statistics are characteristics of a texture pattern, so that texture pairs that share the same features and statistics cannot be told apart by pre-attentive human visual perception?" (Bela Julesz. Visual pattern discrimination. IRE transactions on Information Theory, 8(2): 84-92, 1962).

Julesz's question implies two challenging tasks: (1) What are the internal statistical properties that define a texture from the human perception perspective?, and (2) Given a set of statistical properties, how can one synthesize diverse realistic texture patterns with identical internal statistical properties? These two questions motivate various researchers on pursuing statistical representation and learning frameworks for texture synthesis. Representative pioneer works include k-gon statistics, primal sketch, and FRAME (Filters, Random field, And Maximum Entropy), etc. The FRAME, in particular, models texture as an energy-based model (EBM), seeking to represent stochastic textures by simultaneously learning statistics of textures based on Gabor filter responses and generating novel texture patterns that exhibit the same statistics as the learned texture image by Gibbs sampling.

Empowered with the recent development of deep learning techniques, the energy-based Generative ConvNet (Jianwen Xie, Yang Lu, Song-Chun Zhu, and Yingnian Wu. A theory of Generative ConvNet. In *International Conference on Machine Learning* (ICML), pages 2635-2644, 2016, which is incorporated by reference herein in its entirety (hereinafter, "Xie et al.")) (also known as DeepFRAME model) has been proposed as a deep generalization of the FRAME model for modeling high dimensional signals. Remarkable successes of the generative ConvNets have been shown in modeling and synthesizing images, video sequences, 3D voxels, molecule, unordered point clouds, etc. However, it must be noted that such approaches attempt to learn a distribution of images from of set of images. Thus, such approaches require a number of training images to train the system. Also, such systems tend to be very challenging to train.

Accordingly, what is needed are systems and methods that can be trained using a single image.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

Figure ("FIG.") 1 graphically depicts a learning framework of a multi-scale Patchwise Generative ConvNet (PatchGenCN), according to embodiments of the present disclosure.

FIG. 2 depicts a methodology multi-scale training, according to embodiments of the present disclosure.

FIG. 6 depicts a methodology for Langevin sampling to obtain a synthesized image at a scale, according to embodiments of the present disclosure.

FIG. 7 depicts a generalized methodology for multi-task learning, according to embodiments of the present disclosure.

DETAILED DESCRIPTION OF EMBODIMENTS

Figure 1:
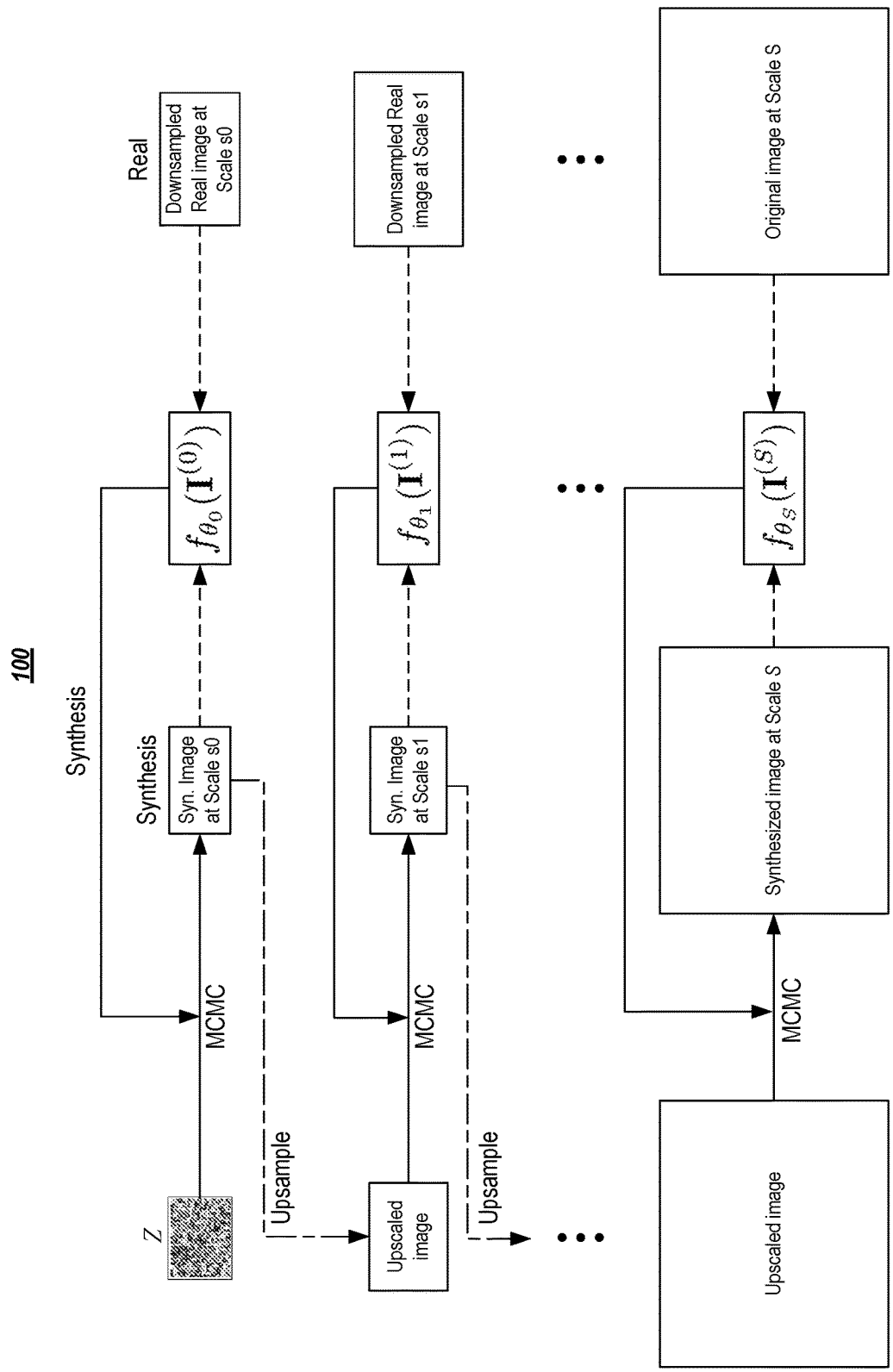

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," "comprising," or any of their variants shall be understood to be open terms and any lists the follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); (5) an acceptable outcome has been reached; and (6) all of the data has been processed.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. General Introduction

Recently, there has been increased attention machine learning models for image processing tasks. As noted above, energy-based generative convolution neural network has recently been applied to image generation task. More recently, the computer vision community has shown a growing interest in the research topic of deep internal learning (DIL), with some that train deep models on a single natural example.

Exploiting internal statistics of a single natural image has been recognized as a significant research paradigm where the goal is to learn the internal distribution of patches within the image without relying on external training data. Different from prior works that model such a distribution implicitly with a top-down latent variable model (e.g., a generator), embodiments herein explicitly represent the statistical distribution within a single natural image by using an energy-based generative framework, where a pyramid of energy functions, each parameterized by a bottom-up deep neural network, are used to capture the distributions of patches at different resolutions. Meanwhile, in one or more embodiments, embodiments of a coarse-to-fine sequential training and sampling strategy are presented to train the model efficiently. Besides learning to generate random samples from white noise, embodiments can learn in parallel with a self-supervised task (e.g., recover the input image from its corrupted version), which can further improve the descriptive power of the learned model. Embodiments are less complex and natural in that they do not require an auxiliary model (e.g., discriminator) to assist the training. Besides, embodiments also unify internal statistics learning and image generation in a single framework. Experimental results presented on various image generation and manipulation tasks, including super-resolution, image editing, harmonization, style transfer, etc., have demonstrated the effectiveness of embodiments for internal learning.

In this patent document, embodiments bring a powerful energy-based generative ConvNet framework into DIL by creating unconditional generative model embodiments learned from a single image. Specifically, embodiments herein show that the internal statistics of overlapping patches within an image can be learned by an energy-based generative neural network (e.g., ConvNet), in which the internal statistics are represented by an energy function parameterized by a deep convolutional neural network, and the generation is driven by the estimated energy function. In one or more embodiments, to capture different scales of internal statistical properties, a pyramid of EBMs with different resolutions are sequentially learned in a coarse-to-fine manner. In one or more embodiments, the EBM at each scale is a generative ConvNet and is trained by an "analysis by synthesis" scheme, in which samples from the EBM are generated via Markov chain Monte Carlo (MCMC) and then the samples are used to compute the gradient of the log-likelihood to update the model parameters. Taking advantage of the multiple resolution setting, the sampling of each EBM is more efficient by using a sequential sampling strategy, where the lower resolution EBM uses its synthesized images to initialize the MCMC of the higher resolution EBM. Once the EBMs are trained from a single image, the pyramid of the learned statistics are useful for different vision tasks, such as generation of images with complex structures and textures, super-resolution, image editing, style transfer, and harmonization.

The energy-based internal learning framework embodiments are appealing for at least the following aspects:

Architecture efficiency: In one or more embodiments, each EBM at a different resolution contains one single bottom-up network as the energy function, and does not need any other assisting network architecture for joint training.

Training efficiency: In one or more embodiments, the EBM relies on maximum likelihood estimation (MLE), which in general does not encounter the mode collapse issue that would commonly occur in adversarial learning.

Representation efficiency: In one or more embodiments, the energy-based learning amounts to training a model that can synthesize images that match the observed statistics. It unifies the concepts of description and generation into one single framework.

Some additional contributions of embodiments include, but are not limited to: (i) embodiment are the first to utilize energy-based deep internal learning from a single image; (ii) embodiments employ sequentially training and sample from a pyramid of EBMs with different resolutions in a coarse-to-fine manner for efficient sampling, stable training, and powerful representation; (iii) to enhance the training, one or more of the energy-based framework embodiments are trained in parallel with some self-supervised tasks; and (iv) strong results are provided in the experiments to verify the effectiveness of the tested framework embodiments in a wide range of image generation and manipulation tasks. One skilled in the art shall recognize other benefits.

B. Related Work

1. Energy-Based Generative Models (EBMs)

Energy-based generative models (EBMs) have been explored over recent years for representation learning in various domains. By bringing in the power of deep ConvNets, Xie et al. proposed the Generative ConvNet, which represents an energy function as a convolutional neural network and generates images via MCMC sampling process. Others have proposed using a non-convergent short-run MCMC to learn the EBM. However, learning such EBM from high-dimensional data has long been considered as challenging. Thus, various approaches have been proposed to assist the training process. For example, the CoopNets trains the EBM jointly with a generator network as an amortized sampler via MCMC teaching; the Multigrid proposes to learn the EBM with multi-grid sampling; Han et. al (Tian Han, Erik Nijkamp, Xiaolin Fang, Mitch Hill, Song-Chun Zhu, and Ying Nian Wu. Divergence triangle for joint training of generator model, energy-based model, and inferential model. In *Proceedings of the IEEE Conference on Computer Vision and Pattern Recognition (CVPR)*, pages 8670-8679, 2019, which is incorporated by reference herein in its entirety) propose triangle divergence that trains the EBM without MCMC by incorporating a Variational Auto-Encoder (VAE); and Jianwen Xie et al. (Jianwen Xie, Zilong Zheng, and Ping Li. Learning energy-based model with variational auto-encoder as amortized sampler. In *Proceedings of the AAAI Conference on Artificial Intelligence (AAAI)*, 2021, which is incorporated by reference herein in its entirety) propose to train the EBM with a VAE as an amortized sampler. Recent advances also bring in flow-based models and diffusion recovery likelihood. Embodiments herein focuses on learning EBMs to represent both global and local statistics of patches within a single natural image.

2. Deep Internal Learning (DIL)

Deep internal learning (DIL) aims at exploiting the internal recurrence of information within natural signals rather than relying on external training data. There are mainly two directions of work. One direction is to exploit the power of deep networks in modeling the internal statistics of the input image. For example, "zero-shot" super-resolution (ZSSR) trains an image-specific CNN from a set of extracted image patches for the super-resolution task. The deep image prior (DIP) shows that a randomly initialized generator network may be used as a prior distribution for recovering noisy images by conditional generation.

The other direction of DIL is the GAN-based generation, where the internal distribution is implicitly modeled by a generator and trained in an adversarial approach. One recent approach, the SinGAN (Tamar Rott Shaham, Tali Dekel, and Tomer Michaeli. SinGAN: Learning a generative model from a single natural image. In *Proceedings of the IEEE Conference on Computer Vision and Pattern Recognition (CVPR)*, pages 4570-4580, 2019, which is incorporated by reference herein in its entirety) (hereinafter, "Shaham et al."), uses a pyramid of multi-scale patch generators and discriminators are trained adversarially from the input image. A similar idea is applied to InGAN (Assaf Shocher, Shai Bagon, Phillip Isola, and Michal Irani. InGAN: Capturing and retargeting the "DNA" of a natural image. In *Proceedings of the IEEE International Conference on Computer Vision (ICCV)*, pages 4492-4501, 2019, which is incorporated by reference herein in its entirety), which uses a conditional generator that contains a geometric transformation to determine the size/shape of the output.

Different from previous approaches, embodiments herein seek to explicitly model the internal distribution of a single image by an energy-based framework. Rather than using generators for ancestral sampling, embodiments generate examples by an iterative MCMC process. Like other works in DIL, embodiments are learned in a fully unsupervised manner.

C. Patchwise Generative ConvNet Embodiments

1. Model Foundation Embodiments

Let I denote a training image and $p_\theta$ denote a probability density function that approximates the internal statistics of I, then the patchwise generative ConvNet may be defined as:

$$p_\theta(I) = \frac{1}{Z(\theta)} \exp(f_\theta(I)), \tag{1}$$

where $Z(\theta) = \int \exp(f_\theta(I)) dI$ is the normalization constant, $f_\theta$ is a convolutional network denoting the negative energy of I, i.e., $\varepsilon(I) = -f_\theta(I)$. The maximum likelihood estimation (MLE) seeks to find $\theta$ to maximize the log-likelihood function of the single image I, i.e., $$\mathcal{L}(\theta) = \log p_\theta(I). \tag{2}$$

The gradient of the $L(\theta)$ with respect to $\theta$ may be given by:

$$\frac{\partial}{\partial \theta} \mathcal{L}(\theta) = \frac{\partial}{\partial \theta} f_\theta(I) - \mathbb{E}_{I \sim p_\theta} \left[ \frac{\partial}{\partial \theta} f_\theta(I) \right], \tag{3}$$

in which the expectation term is analytically intractable and may be approximated by MCMC sampling, such as Langevin dynamics (see, e.g., Radford M Neal et al. MCMC using Hamiltonian Dynamics. *Handbook of Markov Chain Monte Carlo*, 2(11):2, 2011, which is incorporated by reference herein in its entirety), which iterates:

$$I_{t+1} = I_t + \frac{\delta^2}{2} \frac{\partial}{\partial I} f_\theta(I_t) + \delta \epsilon_t, \quad (4)$$

where t indexes the time step and $\delta$ is the Langevin step size. $\epsilon_t \sim \mathcal{N}(0,1)$ is a Gaussian noise serving as a Brownian motion that is useful to explore different modes.

2. Multi-Scale Modeling Embodiments

In this section, embodiments of the model in Eq. (1) are extended to a multi-scale version so that they can capture different scales of internal statistics from the image. Let $\{I^{(s)}, s=0, \ldots, S\}$ denote the multi-scale versions of a training image I, with s indexing the scale, $I^{(0)}$ representing the minimal scale version of I, and $I^{(S)}$ representing the original scale version of I. Given a training image I, a pyramid of images with different scales of I may be created by downsampling operations. Thus, in one or more embodiments, $I^{(s)}$ is a downsampled version of I by a scaling factor $$\frac{1}{r^{S-s}},$$

where $r>1$, or $I^{(s-1)}$ is a downsampled version of $I^{(s)}$ by a scaling factor $1/r$.

Embodiments of the multi-scale model comprise a pyramid of EBMs, which may be generative ConvNets $\{p_{\theta_s}(I^{(s)}), s=0, \ldots, S\}$, trained against a pyramid of images $\{I^{(s)}, s=0, \ldots, S\}$. Each $p_{\theta_s}(I^{(s)})$ is responsible for synthesizing realistic images based on the patch distribution learned from the image $I^{(s)}$ at the corresponding scale s. This may be accomplished by "analysis by synthesis," in which synthesis examples are produced by Langevin dynamics in Eq. (4) and then the sample average may be used to approximate the gradient of the log-likelihood in Eq. (3) for the purpose of updating the parameter $\theta_s$. For $s=0, \ldots, S$, $$\frac{\partial}{\partial \theta_s} \mathcal{L}(\theta_s) = \frac{\partial}{\partial \theta_s} f_{\theta_s}(I^{(s)}) - \frac{1}{n} \sum_{i=1}^{n} \left[ \frac{\partial}{\partial \theta_s} f_{\theta_s}(\tilde{I}_i^{(s)}) \right], \quad (5)$$

where $\{\tilde{I}_i^{(s)}\}$, $i=1, \ldots, n$ are the synthesized images sampled from $p_{\theta_s}(I^{(s)})$ via Langevin dynamics. A challenge to train an embodiment of the framework might lie in the Langevin sampling from the pyramid of EBMs.

3. Multi-Scale Sequential Sampling Embodiments

As to the MCMC sampling strategy, instead of using a noise initialized long-run Langevin dynamics, embodiments may take full advantage of the multi-scale modeling setting to efficiently produce a pyramid of synthesized images by using finite-step MCMC at each scale, which is initialized from the synthesized image generated at the previous coarser scale. To be specific, let $\tilde{I}_t^{(s)}$ denote the synthesized image at Langevin time step t from the model at scale s, and $K^{(s)}$ denote the number of Langevin steps for model at scale s. In one or more embodiments, $\tilde{I}_0^{(0)}$ is initialized by sampling from the uniform distribution $\mathcal{U}$, and then run $K^{(0)}$ Langevin steps to obtain $\tilde{I}_{K^{(0)}}^{(0)}$. After that, for scale $s=1, \ldots, S$, the up-scaled version of $\tilde{I}_{K^{(s-1)}}^{(s-1)}$ sampled from the model $p_{\theta_{s-1}}(I^{(s-1)})$ at the previous coarser scale is used to initialize the finite-step Langevin dynamics that samples from the model $p_{\theta_s}(I^{(s)})$ at the subsequent finer scale.

Formally, the multi-scale sequential sampling may be presented as follows: for $s=0, \ldots, S$:

$$\tilde{I}_0^{(s)} = \begin{cases} Z \sim \mathcal{U}_d((-1,1)^d) & s = 0 \\ \text{Upsample } (\tilde{I}_{K^{(s-1)}}^{(s-1)}) & s > 0 \end{cases} \quad (6)$$

$$\tilde{I}_{t+1}^{(s)} = \tilde{I}_t^{(s)} + \frac{\delta^2}{2} \frac{\partial}{\partial I^{(s)}} f_{\theta_s}(\tilde{I}_t^{(s)}) + \delta \epsilon_t^{(s)}, \quad (7)$$

where $t = 0, \ldots, K^{(s)} - 1$.

In Eq. (6), $\mathcal{U}_d((-1,1)^d)$ is the uniform distribution with a closed interval from $-1$ to $1$, and d is the number of dimensions of $\tilde{I}^{(0)}$. Upsample (•) is used to denote an upsampling operation with a scaling factor r, where $r>1$, which expands the synthesized images from the coarser scale to the finer scale. The upsampling operation is a pseudo-inverse of the downsampling operation used in creating the image pyramid, given the fact that the up-scaled version of $\tilde{I}^{(s-1)}$ is not comparable with the original $I^{(s)}$ due to the loss of high-resolution details. In one or more embodiments, the short-run Langevin dynamics at scale s samples $\tilde{I}^{(s)}$ by creating more high-resolution details for the up-scaled $\tilde{I}^{(s-1)}$, which is much easier than sampling from scratch, especially when s is large.

4. Training and Sampling Method Embodiments & Architecture Embodiments

Provided below are full descriptions of training and sampling method embodiments and details about architecture design embodiments of energy functions.

a) Training and Sampling Method Embodiments

Presented below are learning and sampling methodology embodiments in Methodology 1 (and FIGS. 1 & 2) and Methodology 2 (and FIGS. 3, 4, and 6), respectively. Methodology 1 presents a multi-scale sequential training embodiment of a pyramid of energy-based models, where a multi-scale sequential sampling embodiment presented in Methodology 2 is used for efficient MCMC generation to compute the update gradients.

---

Methodology 1: Multi-Scale Sequential Training Embodiments

Input: (1) A single training image I
(2) Numbers of Langevin steps at different scales $\{K^{(s)}, s = 0, \ldots, S\}$
Output: (1) Model parameters $\{\theta^{(s)}, s = 0, \ldots, S\}$
(2) Different scales of synthesized images $\{\tilde{I}^{(s)}, s = 0, \ldots, S\}$
1. Create multi-scale versions of the training image $\{I^{(s)}, s = 0, \ldots, S\}$ by downsampling operation.
2. for $s = 0$ to S do
3.     Repeat
4.         Sample $\{\tilde{I}_i^{(s)}, i = 1, \ldots, n\}$ from the model at scale s (e.g., by Methodology 2)
5.         Update $\theta_s$ according to Equation (5) using Adam optimizer.
6.     until converged
7. end for

---

FIG. 1 graphically depicts a coarse-to-fine learning framework of a multi-scale Patchwise Generative ConvNet (PatchGenCN) embodiment, according to embodiments of the present disclosure. FIG. 1 illustrates a coarse-to-fine multi-scale learning and sampling procedure 100, according to embodiments of the present disclosure. In one or more embodiments, the model parameterizes the energy function by a convolutional network $f_{\theta_s}$ at each scale s. In one or more embodiments, Z indicates an image initialized from the uniform white noise. The solid arrows indicate the multi-scale MCMC sampling paradigm (in which the solid arrows headed to the left indicate that the MCMC sampling processes utilizes the model $f_{\theta_s}$, the parameters of which are updated each iteration of the training process); the dashed arrows indicate the parameter updates; and the long dash-short dash patterned arrows indicate the image upsampling operations.

FIG. 2 depicts a methodology multi-scale training, according to embodiments of the present disclosure. As noted in the depicted example, the methodology is initialized (205) given a single training image and an initial set of energy-based neural network models (EBMs) in which each EMB is configured to synthesize an image at a scale and the scales of the set of EMBs range from a minimal scale to a maximum scale, the following methodology may be performed.

In the depicted embodiment, multi-scale versions of the training image are created (210). As noted previously, given the initial training image at the maximum resolution, the other scale versions of the training image may be obtained by downsampling operation (e.g., averaging (e.g., mean, median, mode) a set of pixel values to one pixel value). Then, starting with the EMB with the minimal scale and successively moving through the EMBs by increasing scale to the EMB with the maximum scale, the following steps may be performed (215) until a stop condition is reached. An image is sampled (215-A) at the current scale using the EMB at the current scale and a sampling methodology (e.g., MCMC), and the parameters of the current scale EMB is update (215-B) using a comparison involving the sampled image and training image at the current scale. Once a stop condition has been reached for all the EBMs, the synthesized images at each scale may be output (220). Note, also, that the trained EBMs may also be output.

Figure 3:
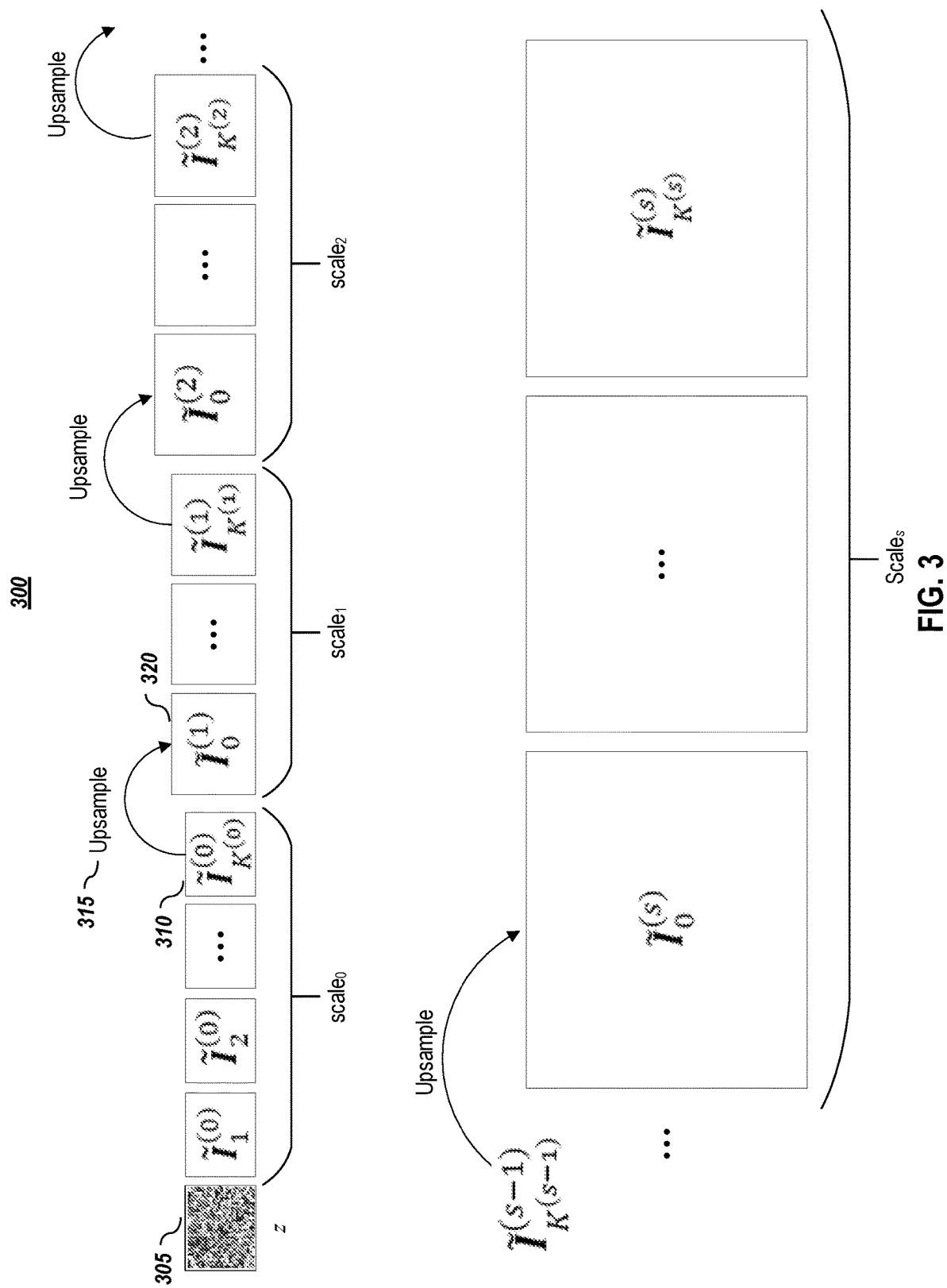
FIG. 3 graphically illustrates a coarse-to-fine multi-scale learning and sampling methodology, according to embodiments of the present disclosure.

In one or more embodiments, a sampling methodology may use Langevin dynamics. FIG. 3 graphically illustrates a multi-scale sequential sampling process starting from a randomly initialized noise image Z with the minimum scale, according to embodiments of the present disclosure. For each scale s, the initial synthesis is updated by $K^{(s)}$ steps of Langevin revision. Note that a number of Langevin steps for each scale may be provided as an input. Note also that each scale may have a different number of Langevin steps, or alternatively, two or more scales may have the same number of steps. In one or more embodiments, a sampled image may be visualized every 10 Langevin steps for each scale, although a different number may be used and as noted above different numbers may be used for different scales. In one or more embodiments, except for the initial synthesis at scale$_0$ which starts with an image, Z 305, from a uniform distribution, the Langevin dynamics of any other scale is initialized from the upsampled version of the Langevin output at its previous scale. For example, as illustrated in FIG. 3, the last synthesized image) $\tilde{I}_{K^{(0)}}^{(0)}$ 310 for scale$_0$ is upsampled (315) to generate an initial image $\tilde{I}_0^{(1)}$ 320 to initialize the Langevin dynamics for scaler.

Figure 4:
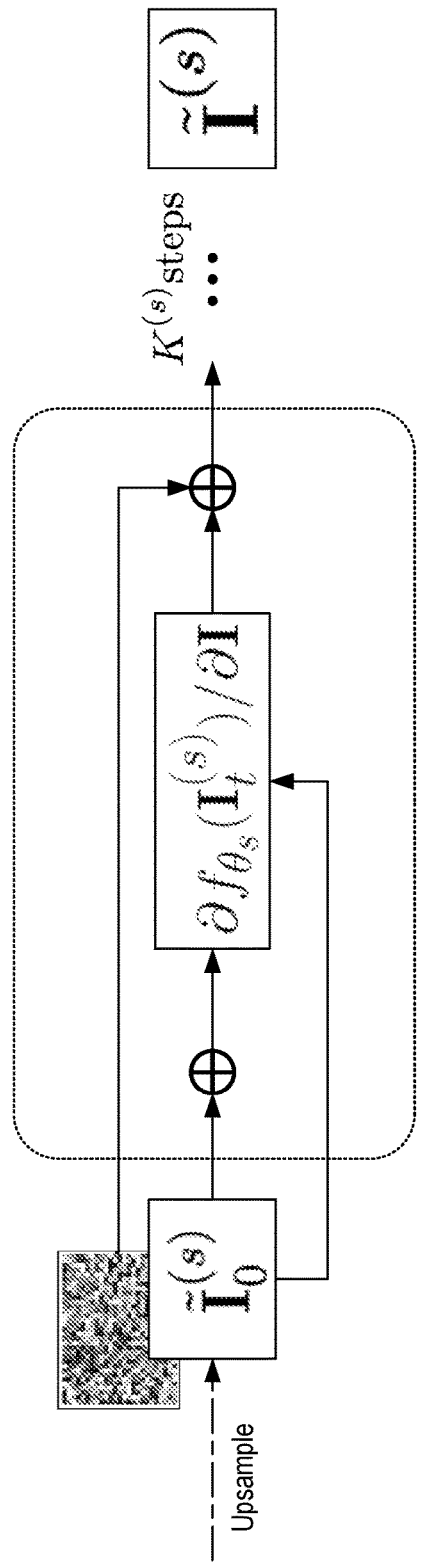
FIG. 4 is a graphical illustration of $K^{(s)}$-step Langevin sampling at scale s, according to embodiments of the present disclosure.
Figure 5:
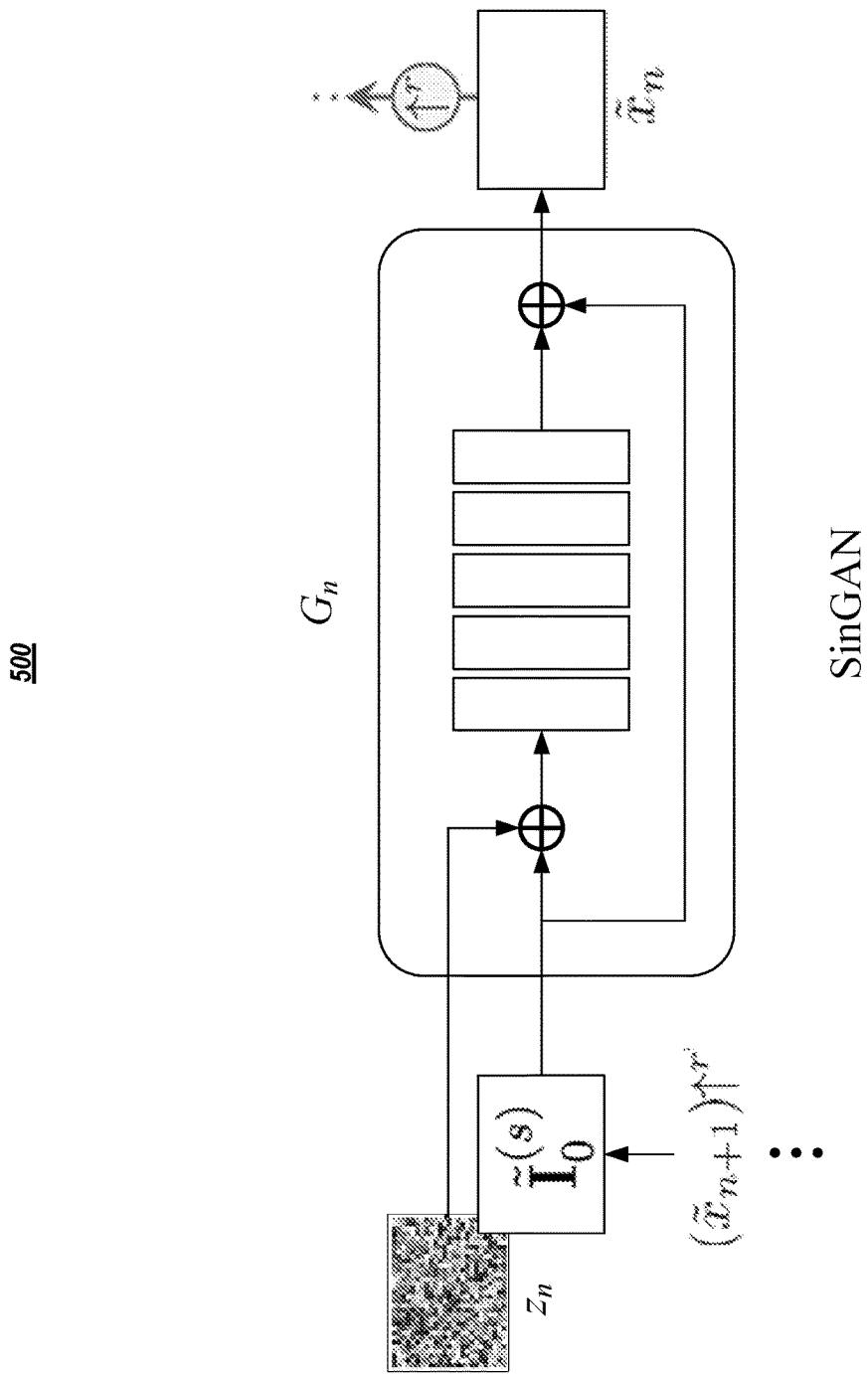
FIG. 5 is a graphical illustration of single-scale generation of SinGAN, where the image synthesis is performed by the top-down generator G.

FIG. 4 is a graphical illustration of $K^{(s)}$-step Langevin sampling at scale s, according to embodiments of the present disclosure. ⊕ indicates the elementwise addition operation. FIG. 5 is a graphical illustration of single-scale generation of SinGAN, where the image synthesis is performed by the top-down generator G. Compared with FIG. 5, the sampling process embodiment depicted in FIG. 4 is derived from the bottom-up energy function $f_{\theta_s}$, and is performed in an iterative way. Such a sampling process may be interpreted as a noise-injected $K^{(s)}$-layer residual generator network.

Methodology 2, below, depicts an example methodology for sampling that may be employed.

---

Methodology 2: Multi-Scale Sequential Training Embodiments

Input: (1) The scale s' of the model that needs to be sampled
(2) Numbers of Langevin steps $\{K^{(s)}, s = 0, \ldots, s'\}$
(3) Learned model parameters $\{\theta^{(s)}, s = 0, \ldots, s'\}$
Output: (1) Synthesized image $\tilde{I}^{(s')}$ at scale s'
1. for s = 0 to s' do
2.   if s = 0 then
3.     Initialize $\tilde{I}^{(s)}_0$ with $U_d((-1, 1)^d)$
4.   else
5.     Initialize $\tilde{I}^{(s)}_0$ with Upsample $(\tilde{I}^{(s-1)}_{K(s-1)})$
6.   end if
7.   for t = 0 $K^{(s)}$ - 1 do
5.     Update $\tilde{I}^{(s)}_{t+1}$ according to Equation 7
9.   end for
10. end for

---

FIG. 6 depicts a methodology for Langevin sampling to obtain a synthesized image at a scale, according to embodiments of the present disclosure. Langevin sampling embodiments may commence given (605) a maximum scale, s', of the energy-based neural network model (EBM) that is to be sampled, a set of energy-based neural network models (EBMs) in which the scales of the set of EBMs range from a minimal scale to the maximum scale, and a number of Langevin steps for each of the scales. In one or more embodiments, starting with the EBM with the minimal scale and successively moving through the EBMs to the EBM with the maximum scale, perform the following steps. The Langevin dynamics process may be initialized (610) with an image. In one or more embodiments, if Langevin dynamics process is operating on the EMB with the minimum scale, the initial image may be obtained from sampling from a uniform distribution, and if it is not the minimum scale, the initial image may be an upsampled version of the Langevin output at the immediate prior scale. Having initialize the Langevin sampling process, the set number of Langevin steps for the current scale is performed (615) to obtain a final synthesized image for that scale. Finally, the synthesized image at the maximum scale (or one or more of the other scales) may be output (620).

b) Model Architecture Embodiments

TABLE 1 shows the network structures of EBMs at different scales, according to various embodiments. Each model comprises five Conv2D layers with 3×3 kernel size. In one or more embodiments, spatial zero paddings are added to the input and padding size 0 is used for all convolutional layers. In one or more embodiments, the Spectral Normalization is used to regularize the Conv2D parameters, and Exponential Linear Unit (ELU) is used as the activation function. Parameters may be initialized from a Gaussian distribution $\mathcal{N}(0, 0.005)$.

TABLE 1

Model architectures of various image scales, according to various embodiments, w and h correspond to the width and the height of the scaled training image, respectively.

| (a) max (w, h) < 64. | (b) max(w, h) > 64. |
|---|---|
| ZeroPadding2D((5, 5)) | ZeroPadding2D((5, 5)) |
| 3 × 3 Conv2D, 64, ELU | 3 × 3 Conv2D, 128, ELU |

TABLE 1-continued

Model architectures of various image scales, according to various embodiments, w and h correspond to the width and the height of the scaled training image, respectively.

| (a) max (w, h) < 64. | (b) max(w, h) > 64. |
|---|---|
| 3 × 3 Conv2D, 32, ELU | 3 × 3 Conv2D, 64, ELU |
| 3 × 3 Conv2D, 32, ELU | 3 × 3 Conv2D, 64, ELU |
| 3 × 3 Conv2D, 32, ELU | 3 × 3 Conv2D, 64, ELU |
| 3 × 3 Conv2D, 1 | 3 × 3 Conv2D, 1 |

5. Multi-Scale MCMC Embodiments as a Flow Generator

Eq. (6) and Eq. (7) may be simplified by rewriting them into the following compact form:

$$Z \sim p_0(Z); \tilde{I}^{(s)} = M_{\Theta_s}^{(s)}(Z, \epsilon), \quad (8)$$

where $p_0$ is the prior distribution to initialize the short-run MCMC for the model at the smallest scale, which may be set to be a uniform distribution in Eq. (6). $\Theta_s = (\theta_0, \theta_1, \ldots, \theta_s)$ is used to denote the models from the minimum scale up to scale s, and the synthesized image $\tilde{I}(s)$ at scale s is affected by $\Theta_s$. E denotes all the randomness in the multi-scale short-run MCMC due to the Langevin noise term in Eq. (7). In one or more embodiments, $M^{(s)}$ contains all steps of Langevin updates in synthesizing the image $\tilde{I}^{(s)}$ at scale s. Thus, $M^{(s)}$ may be viewed as a noise-injected residual network with $\Sigma_{j=0}^{s} K^{(j)}$ layers, then Z as the latent variables and $p_0$ as the prior distribution of Z. In general, the model in Eq. (8) depicts an energy-based dynamics to generate a pyramid of synthesized images $\{\tilde{I}^{(s)}, s=0, \ldots, S\}$ from a noise Z. At the convergence of the learning method embodiment, for $s=0, \ldots, S$, one has $\mathcal{L}'^{(\Theta s)} = 0$, which is:

$$\frac{1}{n} \sum_{i=1}^{n} \left[ \frac{\partial}{\partial \theta_s} f_{\theta_s}\left(\tilde{I}_i^{(s)}\right) \right] = \frac{\partial}{\partial \theta_s} f_{\theta_s}\left(I^{(s)}\right). \quad (9)$$

That means the learned parameters $\{\theta_s, s=0, \ldots, S\}$ can generate realistic image patterns $\{\tilde{I}_t^{(s)}, i=1, \ldots, n\}$ that match the observed training image in terms of internal statistics $$\phi_{\theta_s}(I^{(s)}) = \frac{\partial}{\partial \theta_s} f_{\theta_s}(I^{(s)}),$$

which may be defined by the learned negative energy function $f_{\theta_s}$.

6. Self-Supervised Parallel Training Embodiments

In one or more embodiments, the framework comprises two stages: (1) learning the internal statistics $\{\phi_{\theta_s}(I^{(s)}), s=0, \ldots, S\}$ from a single image, and (2) generating new images based on the learned internal statistics. In other words, the internal statistics are learned in the task of image generation.

Eq. (8) defines an unconditional distribution $p_{\Theta_s}(I^{(s)})$, which corresponds to an unconditional generation. The conditional distribution $p_{\Theta_s}(I^{(s)}|C)$ may be derived from $p_{\Theta_s}(I^{(s)})$. This conditional form of the model may be used for different tasks. For example, (i) if the input condition C is the low-resolution version of I, the learned $M_{\Theta_s}$ targets the task of super-resolution; (ii) if the condition information C is the noisy version of I, the task will be denoising. These tasks are self-supervised since the low resolution or noisy version of I can be created by the model itself.

In one or more embodiments, embodiments learn the internal statistics in the context of these self-supervised tasks by maximizing the conditional log-likelihood of the image given the input condition, i.e., $$\mathcal{L}_{cond}(\Theta_S) = \log p_{\Theta_s}(I^{(S)}|C=c), \quad (10)$$

where c is the observed value of the condition C. The learning and sampling methodology embodiments are essentially the same as maximizing the unconditional log-likelihood in Eq. (5), except that in the sampling step, sampling is from the conditional distribution, which amounts to using c to initialize the Z in the generation process in Eq. (8).

In one or more embodiments, it was found that learning internal statistics with extra self-supervised tasks not only stabilizes the training process but also improves the overall synthesis quality. For example, in one or more embodiments, an auxiliary image super-resolution task may be added, and the model simultaneously learns for random image generation and super-resolution, which means that in addition to starting from uniform white noise, the sequential sampling embodiments also start from the low-resolution image (a downsampled version of the training image) and outputs a super-resolved image that seeks to match the original one. Specifically, in one or more embodiments, for scale 0, $I_{LR}^{(0)} = \text{Upsample}(\text{Downsample}(I^{(0)}))$ is used as the low-resolution (LR) version of $I^{(0)}$, where Upsample(•) and Downsample(•) are upsampling and downsampling operations that use scaling factors r and $$\frac{1}{r},$$

respectively. Then, $c = I_{LR}^{(0)}$ is treated as the initial condition in Eq. (10) and the objective maximizes the total log-likelihood:

$$\mathcal{L}_{tot}(\Theta^S) = \mathcal{L}(\Theta^S) + \lambda \mathcal{L}_{cond}(\Theta^S), \quad (11)$$

where $\lambda$ is a hyperparameter that controls the importance of the self-supervised task in the training process. In experiments, $\lambda = 0.1$ and 8 scales were used, although other values may be used.

Other tasks that may be used include denoising and image translation. Concerning denoising, if the condition information is the noisy version of I, the task is denoising. Concerning image translation, the condition C may be an image from another domain, then G corresponds to cross-domain image translation. One skilled in the art shall recognize that other takes may also be applied.

FIG. 7 depicts a generalized methodology for multi-task learning, according to embodiments of the present disclosure. In one or more embodiments, a multi-task learning method comprises (705) a multi-scale set of energy-based neural network models (EBMs) in which each EBM is configured to synthesize an image at a scale and the scales of the set of EBMs range from a minimal scale to a maximum scale, a multi-scale set of versions of a training image that ranges from the minimal scale to the maximum scale so that each EBM has a corresponding version of the training image at the same scale as the EBM, and an input condition image. As mentioned above, the input condition image may be related to any of a number of tasks. For example, if the input condition is the low-resolution version of I, the learned $M_{\Theta_s}$ targets the task of super-resolution, if the condition information is the noisy version of I, the task will be denoising, and if the condition C is an image from another domain, then $M_{\Theta_s}$ corresponds to cross-domain image translation.

The multi-scale set of EBMs, $\Theta_s$, may be trained (710) for a conditional task using the conditional image as an input to at lowest scale EBM and a random image generation task, in which training loss represents a combination of the unconditional generation loss and conditional generation loss. In one or more embodiments, a combination such as depicted Eq. (11) may be used for training.

7. Using Set of Trained EBMs Embodiments

Figure 8:
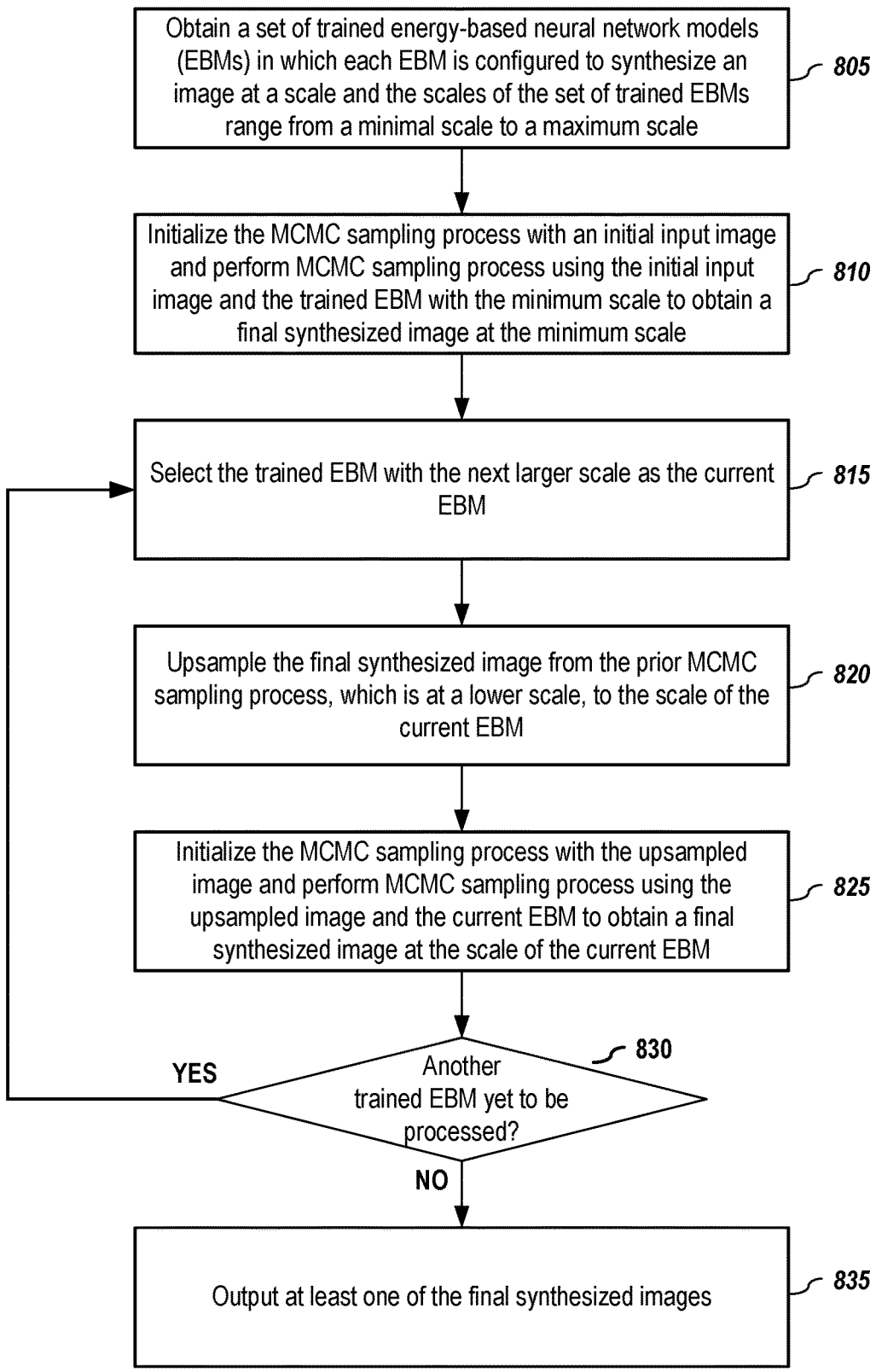
FIG. 8 depicts a generalized methodology for using a set of trained energy-based models for image generation, according to embodiments of the present disclosure.

One skilled in the art shall recognize that a set of trained EBMs may be used to generate images. FIG. 8 depicts a generalized methodology for using a set of trained energy-based models for image generation, according to embodiments of the present disclosure. In one or more embodiments, the methodology commences by obtaining (805) a set of trained energy-based neural network models (EBMs), in which each EBM is configured to synthesize an image at a scale and the scales of the set of trained EBMs range from a minimal scale to a maximum scale. The set of trained EBMs may be obtained by any of the training methods discussed above.

Given the pyramid of trained EBMS, the process may commence by starting with the trained EBM with the minimum scale and moving in order of increasing scale until the trained EBM with the maximum scale has been processed. Thus, an MCMC sampling process may be initialized with an initial input image, and the MCMC sampling process is performed (810) using the initial input image and the trained EBM with the minimum scale to obtain a final synthesized image at the minimum scale. In one or more embodiments, the input image may be random noise. Alternatively, as discussed in the prior section, if the set of trained EBMs were trained with unconditional and conditional tasks, the input image may be a low resolution image, a noisy image, a cross domain image, or other image related to the conditional task.

As depicted in the example methodology, the next step involves selecting (815) the trained EBM with the next larger scale, and this selected EBM is "the current EBM" for an iterative round. To help with the MCMC sampling process, the final synthesized image from the prior MCMC sampling process, which is at a lower scale, is upsampled (820) to the scale of the current EBM. In one or more embodiments, the MCMC sampling process is initialized (825) with the upsampled image and the MCMC sampling process is performed using the upsampled image and the current EBM to obtain a final synthesized image at the scale of the current EBM.

Steps 815-825 are repeated (830) while there is yet another trained EBM that has not yet to be processed. If all trained EBMs have been processed, at least one of the final synthesized images may be output (835). For example, the final synthesized image of the last EBM, which will produce an image at the maximum scale, may be output. Alternatively, final images for two or more of the stages may be output.

D. Experiments

In this section, results are presented, and tested embodiments are compared against the prior art on DIL. The effectiveness of different modules in multi-scale training embodiments are studied. Lastly, the capability of embodiments is demonstrated on various image generation and manipulation tasks. For brevity, embodiments may be referred to as PatchGenCN.

It shall be noted that these experiments and results are provided by way of illustration and were performed under specific conditions using a specific embodiment or embodiments; accordingly, neither these experiments nor their results shall be used to limit the scope of the disclosure of the current patent document.

1. Implementations a) Image Preprocessing Embodiments

Given an input image, if the length of its longer edge exceeds 250 pixels, it is proportionally resized such that its longer edge fits to 250 pixels. The (resized) input image is denoted by $I^{(S)}$. Then, a set of varied resolution images, $\{I^{(s)}, s=0, \ldots, S-1\}$, are created by sequentially downsampling the image $I^{(S)}$ with a properly chosen scaling factor $1/r$ until the length of the shorter edge becomes 25 pixels. In one or more embodiments, the scale factor may be determined according to the maximum image size, minimum image size, and number of total scales required, in which the number of total scales may be empirically chosen to optimize the performance. For all experiments, the Lanczos filter was used for downsampling and the BiCubic interpolation was used for upsampling, although other filters and interpolations may be used.

b) Model Architecture Embodiments

In one or more embodiments, the model contains a single neural network that plays the role of energy function at each scale. In one or more embodiments, the Patch ConvNets, such as used by Shaham et al., is used to capture the internal statistics of overlapping image patches within the entire image. Specifically, the EBM at each scale is parameterized by a ConvNet that comprises five convolutional layers with kernel size 3×3 and stride 1. To stabilize the training process, Exponential Linear Unit (ELU) is used as the activation function and spectral normalization is to regularize the parameters in convolutional layers.

c) Training Details

60 Langevin steps with step size 0.1 was used for the EBM at the first scale, and 30 steps were used for each of the other higher scale EBMs. For all scales of $\theta_s$, Adam Optimizer was used, and the learning rate was linearly decayed from $4 \times 10^{-4}$ to $5 \times 10^{-5}$. Each scale was trained for 4000 epochs or until an early stop criterion was met (e.g., the mean squared error in the self-supervised task is less than 0.001).

2. Unconditional Image Generation Embodiments a) Evaluation

The tested embodiments were evaluated using scene images selected from different datasets, as well as other art images. Different from image retargeting, a goal of this task is to generate random samples that match the internal statistical properties of the training image.

Qualitative results were obtained that show the synthesis results by learning from a single input image. In experiments, a single training example was used and multiple synthesis results at various aspect ratios were obtained. The tested framework embodiment is able to generate realistic images with arbitrary sizes and aspect ratios by sampling from the learned distribution that captures different scales of internal statistical properties of patches within the input image. The compelling performance demonstrates that the tested model embodiment is able to capture patchwise statistics and generate realistic images of arbitrary sizes and various aspect ratios. Some observations are as follows: (i) each sampled result not only contains local repetitive patterns existing in the texture information but also preserves the global spatial layout as shown in the training example; (ii) the results may contain objects that have different sizes or shapes as in the training input, e.g., stones and trees; and (iii) results of different sizes are generated by more than resizing the image size, but also matching the statistics within the image patches.

The realism of the synthesized results was quantitatively evaluated using the following metrics:

Human study: "Real vs Fake" test. "Real vs fake" perceptual studies were run on the generated samples to assess the realism of our results. The same perceptual study protocol from Shaham et al. was followed to run both paired studies, where users were asked to find the fake image from a pair of real image and generated sample, and unpaired studies, where users were asked to judge whether a presented image is real or fake. In both cases, the images were presented for 1 second. Data was gathered from 25 participants per methodology that was tested. Each participant performed a sequence of 30 trials for paired tests and 60 for unpaired tests with 30 training images and 30 corresponding generated samples.

Single Image Fréchet Inception Distance (SIFID). Following Shaham et al., a SIFID metric, an extension of the Fréchet Inception Distance (FID), was adopted to automatically assess the patchwise similarity of inception features between a generated sample and a single real image. Specifically, rather than resizing images to the size of 299×299 as in computing FID, an image of its original resolution was fed into the InceptionNet (Christian Szegedy, Wei Liu, Yangqing Jia, Pierre Sermanet, Scott Reed, Dragomir Anguelov, Dumitru Erhan, Vincent Vanhoucke, and Andrew Rabinovich. Going deeper with convolutions. In *Proceedings of the IEEE Conference on Computer Vision and Pattern Recognition (CVPR)*, pages 1-9, 2015, which is incorporated by reference herein in its entirety) and the output of layer Conv2d_2 b_3×3, the last layer of the first convolutional block, was taken to retrieve its patchwise features. Then, the distance was computed using the same formula in Martin Heusel, Hubert Ramsauer, Thomas Unterthiner, Bernhard Nessler, and Sepp Hochreiter. GANS Trained by a Two Time-Scale Update Rule Converge to a Local Nash Equilibrium. In *Advances in Neural Information Processing Systems (NIPS)*, pages 6626-6637, 2017, which is incorporated by reference herein in its entirety.

Naturalness Image Quality Evaluator (NIQE). Even though SIFID can partially show the realism of the generated samples, its value may suffer from a high variance for different generated results. Therefore, NIQE, a no-reference image quality score, was also used to evaluate the overall naturalness of the generated samples (Anish Mittal, Rajiv Soundararajan, and Alan C Bovik. Making a "Completely Blind" Image Quality Analyzer. *IEEE Signal processing letters*, 20(3):209-212, 2012, which is incorporated by reference herein in its entirety). The NIQE score is measured by comparing the statistical features of input images to a corpus of natural, undistorted scene images using a natural scene statistic (NSS) model. Lower NIQE score indicates better image quality with less artifacts.

b) Comparison Against Baselines

One important baseline method is SinGAN. A model embodiment was compared model with SinGAN in TABLE 2 using the above metrics. As can be seen, synthesized results from the tested embodiment are on par with or better than the generation outputs from SinGAN over all metrics. The lower NIQE score indicates better perceptual quality compared to SinGAN. The numbers reported here are not perfectly aligned with those in Shaham et al. because of the difference in the testing images.

TABLE 2

Quantitative evaluation on images from a dataset. The values for the "real vs fake" indicate the percentage of participants who label the generated samples as real ones.

| Methodologies | SIFID | real vs fake paired | real vs fake unpaired | NIQE |
|---|---|---|---|---|
| SinGAN | 0.11 | 35.73% | 39.33% | 5.22 |
| PatchGenCN Embodiments | 0.09 | 33.60% | 40.13% | 5.10 |

Comparisons of a generation process embodiment with that of SinGAN were performed, including comparisons of the coarse-to-fine sequential generation between a model embodiment and SinGAN. The test model embodiment generates meaningful results at all scales, while SinGAN may fail at the top few scales. This observation matches the behavior of the multi-scale sampling strategy presented in Section C.3, i.e., the EBM at the first scale learns to capture the global layout of the training image, while each of the EBMs at the subsequent finer scales learns to enrich the output of the EBM at the previous coarser scale with details.

The model complexity of an embodiment is compared with two GAN-based models in TABLE 3. For fair comparison, 8 scales were used for all multi-scale architectures. The training time was measured as the sum of average computation time per epoch over all scales, while the inference time was measured as the average duration of generating one sample of the original resolution. Similar to SinGAN, light-weight ConvNets were used for all EBMs, which have much fewer parameters than InGAN. Besides, comparable training time for the tested embodiment was shown relative to that of SinGAN. Some of the potential key factors resulting in slowness of the training of the tested embodiment are the MCMC sampling and spectral normalization, while SinGAN takes a slightly longer time because of the iterative computation of gradient penalty. As to inference, the tested model embodiment takes a bit longer than GAN-based methods due to the usage of MCMC.

TABLE 3

Model complexity comparisons of the tested method embodiment with GAN-based methods, measured as an average of 10 images of size 250 × 166 pixels on a single RTX 2080 GPU.

| Methodologies | # Params | Train Time (sec./epoch) | Inf. Time (sec.) |
|---|---|---|---|
| SinGAN | 1.15 M | 1.58 | 0.04 |
| InGAN | 6.81 M | 0.20 | 0.05 |
| PatchGenCN Embodiment | 0.99 M | 1.50 | 0.72 | c) Ablation Studies

Ablation studies were conducted to evaluate the effectiveness of different modules in an embodiment of the framework.

Number of total scales. Tests were performed to show the generation results using different numbers of scales for a tested embodiment. When the model embodiment is trained with a single scale, the generated result is basically a texture image, where image patches are randomly distributed. When using 2 scales, the model embodiment can create a coarse structure, however, the details are still missing because internal statistics at other scales are not learned. More details can be seen as the number of total scales increases.

Effectiveness of parallel self-supervised training. Tests were performed to show the synthesis results using different values of the importance factor λ of the self-supervised task. The results were obtained using different values of λ in Eq. (11), where λ=0 indicates that the model embodiment is trained without extra self-supervised tasks. It can be seen that the quality of the synthesized images improves by adding a self-supervised task. Experiments show that using a λ either too large or too small may lead to an unstable training process.

3. Super Resolution Embodiments

In one or more embodiments, the model increases the resolution of the input image by a factor $r^k$, $k \in \mathbb{N}$, without relying on any external training data. In one or more embodiments, the model embodiment is first trained on the input image with a scaling factor r. In one or more embodiments, only the trained EBM $f_{\theta_s}$ at the original scale S is used for the task of super-resolution. Starting from the upscaled input image Upsample($I^{(S)}$), multi-scale sequential sampling for s=S+1, . . . , S+k is performed by following the same process introduced in Eqs. (6) and (7), except that $f_{\theta_s}$ is used for all s>S. Tests performed on images to obtain 4× super-resolution results. NIQE was used as the major quantitative metric for evaluating the visual perception quality. The tested model embodiment outperformed the prior art of deep internal learning in terms of NIQE, since it is able to produce more details.

TABLE 4 illustrates comparison on super-resolution task with baseline models, according to embodiments of the present disclosure. NIQE was used to measure the visual quality of the super-resolved results. Peak signal-to-noise ratio (PSNR) between the generated result and the real high-resolution image is also reported for reference.

| | BiCubic (PSNR/ NIQE) | DIP (PSNR/ NIQE) | ZSSR (PSNR/ NIQE) | SinGAN (PSNR/ NIQE) | PatchGenCN Embodiment (PSNR/NIQE) |
|---|---|---|---|---|---|
| Test Image 1 | (25.80/ 5.59) | (28.79/ 6.83) | (28.35/4.40) | (24.36/5.21) | (22.54/4.32) |
| Test Image 2 | (31.86/ 6.49) | (31.72/ 4.48) | (33.54/4.75) | (30.56/4.35) | (28.45/3.74) |

4. Image Manipulation Embodiments

Given a background image $I^{(S)}$, it may be manipulated by either copying and moving some region or pasting an external object in it. The resulting edited image is denoted by $I'^{(S)}$. In one or more embodiments, the model blends the pasted object with the original background image or smooths the artifacts due to editing. The model embodiment was first trained on $I^{(S)}$ to obtain the pyramid of EBMs. The down-scaled version of the edited image $I'^{(\hat{s})}$ was created, where $0 \leq \hat{s} < S$ is an intermediate scale such that $I'^{(\hat{s})}$ will not lose many details. The multiscale sequential sampling embodiment was performed with $\{f_{\theta_s}, s=\hat{s}, \ldots, S\}$, starting from $I_0^{(\hat{s})} \leftarrow I'(\hat{s})$. The synthesized output $\tilde{I}^{(S)}$ is the harmonized result of $I'^{(S)}$. Typically, $\hat{s}$ was set at $\hat{s}=S-4$ or $\hat{s}=S-5$. Results were compared with baselines on the image harmonization task. The tested model embodiment applied more texture information from the background image to the objects than SinGAN, while preserving better object identity than Deep Painting Harmonization (DPH). Thus, the embodiment is able to blend the original image with an external object by preserving the object's identity and applying the learned texture and color information to the object.

Similar qualitative results were also seen for image editing. It was found that more advanced editing was also applicable. If the edited image is a painting clipart that specifies the layout of semantic objects, then the resulting synthesis is an image, where the global structure of the painting is preserved, while the texture matches the background image.

5. Style Transfer Embodiments

Given a style image $I^{(S)}$ and a content image $I_c^{(S)}$, a model embodiment learns to stylize $I_c^{(S)}$ with the style in $I^{(S)}$, while preserving the content's identity. During the training of an unconditional model $p_{\Theta_s}(I^{(S)})$ on $I^{(S)}$, an extra conditional generation task may be added to simultaneously learn $p_{\Theta_s}(I^{(S)}|I_c^{(S)})$ for style transfer, which can be done by downsampling $I_c^{(S)}$ and using it to initialize the Langevin at one of the coarser scales. Specifically, when training EBM at scale s, the coarser scale max(0, s−n), where 0<n<S, was chosen as the starting point to generate the stylized image. Results showed that the model embodiment can convert images to artistic styles while preserving the content better than other approaches.

E. Some Conclusions

Presented herein are embodiments of PatchGenCN, a novel multi-scale patchwise energy-based framework with a bottom-up ConvNet serving as the energy function at each scale, for learning the internal distribution within a single natural image. Compelling performance demonstrates the powerful capability of model embodiments on capturing internal patchwise statistics within a single image and generating realistic images on various image generation and manipulation tasks. Embodiments are also appealing because they integrate the representation and generation into one single framework.

F. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drive, solid state drive, or both), one or more network ports for communicating with external devices as well as various input and output (I/O) devices, such as a keyboard, mouse, touchscreen, stylus, microphone, camera, trackpad, display, etc. The computing system may also include one or more buses operable to transmit communications between the various hardware components.

Figure 9:
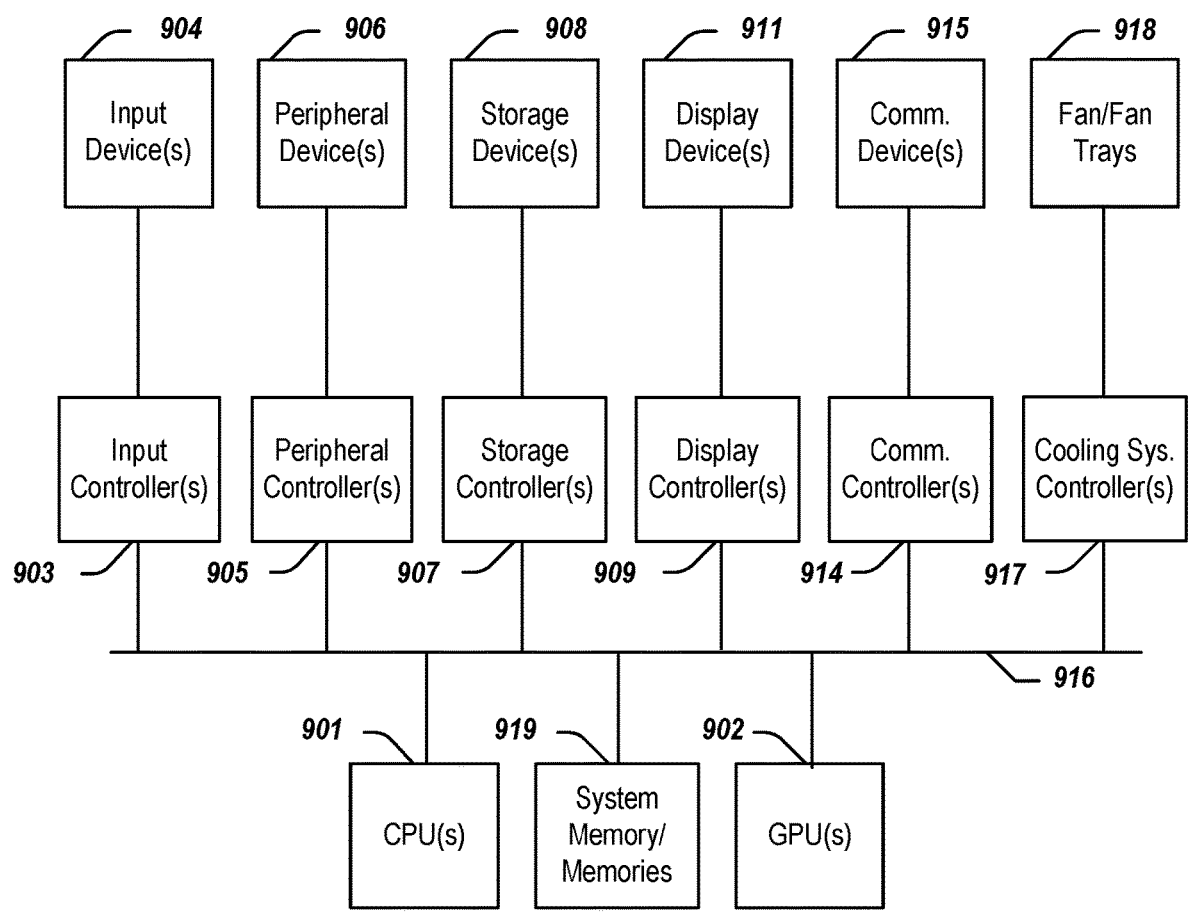
FIG. 9 depicts a simplified block diagram of a computing device/information handling system, according to embodiments of the present disclosure.

FIG. 9 depicts a simplified block diagram of an information handling system (or computing system), according to embodiments of the present disclosure. It will be understood that the functionalities shown for system 900 may operate to support various embodiments of a computing system—although it shall be understood that a computing system may be differently configured and include different components, including having fewer or more components as depicted in FIG. 9.

As illustrated in FIG. 9, the computing system 900 includes one or more CPUs 901 that provides computing resources and controls the computer. CPU 901 may be implemented with a microprocessor or the like, and may also include one or more graphics processing units (GPU) 902 and/or a floating-point coprocessor for mathematical computations. In one or more embodiments, one or more GPUs 902 may be incorporated within the display controller 909, such as part of a graphics card or cards. Thy system 900 may also include a system memory 919, which may comprise RAM, ROM, or both.

A number of controllers and peripheral devices may also be provided, as shown in FIG. 9. An input controller 903 represents an interface to various input device(s) 904. The computing system 900 may also include a storage controller 907 for interfacing with one or more storage devices 908 each of which includes a storage medium such as magnetic tape or disk, or an optical medium that might be used to record programs of instructions for operating systems, utilities, and applications, which may include embodiments of programs that implement various aspects of the present disclosure. Storage device(s) 908 may also be used to store processed data or data to be processed in accordance with the disclosure. The system 900 may also include a display controller 909 for providing an interface to a display device 911, which may be a cathode ray tube (CRT) display, a thin film transistor (TFT) display, organic light-emitting diode, electroluminescent panel, plasma panel, or any other type of display. The computing system 900 may also include one or more peripheral controllers or interfaces 905 for one or more peripherals 906. Examples of peripherals may include one or more printers, scanners, input devices, output devices, sensors, and the like. A communications controller 914 may interface with one or more communication devices 915, which enables the system 900 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 900 comprises one or more fans or fan trays 918 and a cooling subsystem controller or controllers 917 that monitors thermal temperature(s) of the system 900 (or components thereof) and operates the fans/fan trays 918 to help regulate the temperature.

In the illustrated system, all major system components may connect to a bus 916, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, PLDs, flash memory devices, other non-volatile memory devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method comprising:
given a set of energy-based neural network models (EBMs) in which each EBM is configured to synthesize an image at a scale and the scales of the set of EBMs range from a minimal scale to a maximum scale, and given a multi-scale set of versions of a training image that similarly range from the minimal scale to the maximum scale so that each EBM has a corresponding version of the training image at the same scale as the EBM, performing steps comprising:
training each of the EBMs in the set of EBMs to synthesize an image at the scale of the EBM based on a patch distribution learned from the version of the training image at the scale of the EBM given an initial input image at the scale of the EBM and the version of the training image at the scale of the EBM, in which for at least some of the EBMs the initial input image is a synthesized image from a lower scaled EBM that has been upsampled to the scale of the EBM, comprising:
for each EBM:
using the initial input image for the EBM and the EBM in a Markov chain Monte Carlo (MCMC) sampling process to produce the synthesized image at the scale of the EBM; and
updating parameters of the EBM by using a comparison comprising one or more the synthesized image generated using the MCMC sampling process and the version of the training image at the scale of the EBM; and
responsive to a training stop condition being met, output the trained set of EBMs.

2. The computer-implemented method of claim 1 wherein the MCMC process is an iterative process with a finite number of Langevin dynamics steps.

3. The computer-implemented method of claim 2 wherein the finite number of Langevin dynamics steps for the MCMC sample process is set for each EBM and is a same or a different finite number than one or more for other EBMs.

4. The computer-implemented method of claim 2 wherein the synthesized image from a lower scaled EBM that has been upsampled to the scale of the EBM is the synthesized image generated at a last step of the finite number of Langevin dynamics steps.

5. The computer-implemented method of claim 1 wherein, for the EBM with the minimal scale, the initial input image is an image generated by randomly sampling from a uniform distribution.

6. The computer-implemented method of claim 1 wherein, the comparison comprising one or more the synthesized image generated by the EBM using the MCMC sampling process and the version of the training image at the scale of the EBM comprises:
determining a loss gradient that at least approximates difference between internal statistics of the training image as determined the EBM versus an average of internal statistics of one or more synthesized images as determined by the EBM.

7. The computer-implemented method of claim 1 further comprising, given an input condition image:
additionally training the set of EBMs for a conditional task using the input condition image as an input to the EBM with the minimum scale, in which training loss for the set of EBMs represents a combination of unconditional generation loss and conditional generation loss.

8. The computer-implemented method of claim 7 wherein:
the input condition image is a low-resolution image and the conditional task is super-resolution;
the input condition image is a noisy image and the conditional task is denoising; and
the input condition image is an image from another domain and the conditional task is cross-domain image translation.

9. A computer-implemented method comprising:
obtaining the trained set of (EBMs) trained according to the method of claim 1;
starting with a trained EBM with the minimum scale and moving in order of increasing scale until the trained EBM with the maximum scale has been processed, performing steps comprising:
responsive to the trained EBM being the trained EBM with the minimum scale, using an initial input image having the minimum scale and the trained EBM in a Markov chain Monte Carlo (MCMC) sampling process to produce a final synthesized image at the scale of the trained EBM; and
responsive to the trained EBM not being the trained EBM with the minimum scale, using an initial image having the scale of the trained EBM and the trained EBM in a Markov chain Monte Carlo (MCMC) sampling process to produce a final synthesized image at the scale of the trained EBM, in which the initial image is obtained from the final synthesized image from the trained EBM with a lower scale; and
outputting at least one of the final synthesized images.

10. The computer-implemented method of claim 9 the MCMC process is an iterative process with a finite number of Langevin dynamics steps.

11. The computer-implemented method of claim 9 wherein, for the trained EBM with the minimal scale, the initial input image is one of:
an image generated by randomly sampling from a uniform distribution;
a low-resolution image;
a noisy image; or
an image from domain different from that used to train the trained set of EBMs.

12. A non-transitory computer-readable medium or media comprising one or more sequences of instructions which, when executed by at least one processor, causes steps to be performed comprising:
given a set of energy-based neural network models (EBMs) in which each EBM is configured to synthesize an image at a scale and the scales of the set of EBMs range from a minimal scale to a maximum scale, and given a multi-scale set of versions of a training image that similarly range from the minimal scale to the maximum scale so that each EBM has a corresponding version of the training image at the same scale as the EBM, performing steps comprising:
training each of the EBMs in the set of EBMs to synthesize an image at the scale of the EBM based on a patch distribution learned from the version of the training image at the scale of the EBM given an initial input image at the scale of the EBM and the version of the training image at the scale of the EBM, in which for at least some of the EBMs the initial input image is a synthesized image from a lower scaled EBM that has been upsampled to the scale of the EBM, comprising:

for each EBM:
  using the initial input image for the EBM and the EBM in a Markov chain Monte Carlo (MCMC) sampling process to produce the synthesized image at the scale of the EBM; and
  updating parameters of the EBM by using a comparison comprising one or more the synthesized image generated using the MCMC sampling process and the version of the training image at the scale of the EBM; and
responsive to a training stop condition being met, output the trained set of EBMs.

13. The non-transitory computer-readable medium or media of claim 12 wherein the MCMC process is an iterative process with a finite number of Langevin dynamics steps and wherein the finite number of Langevin dynamics steps for the MCMC sample process is a same or a different finite number than for one or more other EBMs.

14. The non-transitory computer-readable medium or media of claim 13 wherein the synthesized image from a lower scaled EBM that has been upsampled to the scale of the EBM is the synthesized image generated at a last step of the finite number of Langevin dynamics steps.

15. The non-transitory computer-readable medium or media of claim 12 wherein, for the EBM with the minimal scale, the initial input image is an image generated by randomly sampling from a uniform distribution.

16. The non-transitory computer-readable medium or media of claim 13 wherein, the comparison comprising one or more the synthesized image generated by the EBM using the MCMC sampling process and the version of the training image at the scale of the EBM comprises:
  determining a loss gradient that at least approximates difference between internal statistics of the training image as determined the EBM versus an average of internal statistics of one or more synthesized images as determined by the EBM.

17. The non-transitory computer-readable medium or media of claim 12 further comprising one or more sequences of instructions which, when executed by at least one processor, causes steps to be performed comprising, given an input condition image:
  additionally training the set of EBMs for a conditional task using the input condition image as an input to the EBM with the minimum scale, in which training loss for the set of EBMs represents a combination of unconditional generation loss and conditional generation loss.

18. The non-transitory computer-readable medium or media of claim 12 wherein each of the EBMs is a patchwise generative convolution neural network.

* * * * *